(12) United States Patent
Rye et al.

(10) Patent No.: US 7,641,204 B2
(45) Date of Patent: Jan. 5, 2010

(54) WHEELBARROW WITH BOLT HEAD DEPRESSIONS

(75) Inventors: Palle Rye, Shillington, PA (US); Erich Kaintz, Fleetwood, PA (US); Stephen Wickman, Oley, PA (US)

(73) Assignee: Brentwood Industries, Inc., Reading, PA (US)

( * ) Notice: Subject to any disclaimer, the term of this patent is extended or adjusted under 35 U.S.C. 154(b) by 415 days.

(21) Appl. No.: 11/534,841

(22) Filed: Sep. 25, 2006

(65) Prior Publication Data

US 2008/0079228 A1    Apr. 3, 2008

(51) Int. Cl.
*B62B 1/00* (2006.01)
*B62B 7/02* (2006.01)
*B62C 1/00* (2006.01)
*B62B 1/18* (2006.01)

(52) U.S. Cl. ............... 280/47.31; 280/47.3; 280/47.24; 280/47.26; 280/78; 280/63; 280/47.131; 280/47.17

(58) Field of Classification Search ............. 280/47.3, 280/47.31, 47.24, 47.26, 78, 63, 47.131, 280/47.17
See application file for complete search history.

(56) References Cited

U.S. PATENT DOCUMENTS

| | | | |
|---|---|---|---|
| 0,395,573 A | 1/1889 | Mallory | |
| 0,759,834 A | 5/1904 | Steele | |
| 1,418,173 A | 5/1922 | Reynolds | |
| 1,526,935 A | 2/1925 | Roemer | |
| 1,559,646 A | 11/1925 | Roemer | |
| 2,012,656 A | 8/1935 | Bremner | |
| 2,071,532 A | 2/1937 | Hyman | |
| 2,728,584 A * | 12/1955 | Brown | 280/47.26 |
| 3,170,707 A | 2/1965 | Millar, Jr. et al. | |
| 4,401,313 A | 8/1983 | Filas | |
| 4,789,171 A * | 12/1988 | Porter | 280/47.18 |
| 4,794,992 A | 1/1989 | Loch | |
| 5,026,079 A * | 6/1991 | Donze et al. | 280/47.31 |
| 5,878,827 A * | 3/1999 | Fox | 180/19.1 |
| 6,869,098 B2 * | 3/2005 | Tomchak et al. | 280/653 |
| 2003/0201616 A1 * | 10/2003 | Friel | 280/47.31 |
| 2005/0062245 A1 * | 3/2005 | Tomchak et al. | 280/47.31 |
| 2007/0164526 A1 * | 7/2007 | Martini et al. | 280/47.26 |
| 2007/0290467 A1 * | 12/2007 | Gonzalez | 280/47.31 |
| 2007/0296166 A1 * | 12/2007 | Robinson | 280/47.31 |

OTHER PUBLICATIONS

U.S. Appl. No. 60/758,263, filed Jan. 11, 2006, Martini et al.

* cited by examiner

*Primary Examiner*—Paul N Dickson
*Assistant Examiner*—John R Olszewski
(74) *Attorney, Agent, or Firm*—Panitch Schwarze Belisario & Nadel LLP (57) ABSTRACT

A wheelbarrow for transporting materials includes an undercarriage, a wheel rotatably mounted to the undercarriage, a pan mounted to and supported by the undercarriage and a fastening mechanism having a head. The pan includes a base wall and an upright wall extending upwardly from the base wall. The base wall and upright wall define a carrying space and a carrying surface facing the carrying space. A depression is formed in the pan defining a depression plane that is generally continuous with the carrying surface. The fastening mechanism mounts the pan to the undercarriage such that the head is positioned within the depression between the undercarriage and the depression plane.

27 Claims, 4 Drawing Sheets

WHEELBARROW WITH BOLT HEAD DEPRESSIONS

BACKGROUND OF THE INVENTION

The present application is directed to a wheelbarrow for transporting materials and, more particularly, to a wheelbarrow including bolt head depressions that generally prevent supporting bolt heads from extending into a carrying space of the pan. The bolt head depressions also permit a user to scrape materials from the wheelbarrow with a shovel or other scraping implement generally without impacting the supporting bolt heads or other protrusions extending from the carrying surface.

Wheelbarrows are common tools utilized typically in construction, landscaping and consumer material transportation. The wheelbarrow typically includes a pan that is mounted to a support structure having a pair of handles for the user to grasp and manipulate the wheelbarrow. On an opposite end from the handles, one or two wheels are typically mounted to the support structure that a user employs to move the support structure, pan and materials within the pan.

Typical wheelbarrow construction includes mounting the pan to the support structure with one or more bolts with each bolt having a head. The head is typically exposed from a carrying surface of the pan or extends into a carrying area of the pan. The protrusion of the bolt heads into the pan creates an obstacle for a user if the contents of the pan are being scraped from the pan using an edge of a shovel or other scraping implement. Specifically, if a user is scraping material, for example, concrete or mulch, from the pan using a shovel and slides the edge of the shovel into the bolt head, the bolt head, pan, support structure or shovel may be damaged by the impact. Repeated impacts with a shovel or even materials being carried in the pan has an adverse impact on the structural integrity of the wheelbarrow and has the potential to damage valuable tools (e.g. shovel). In addition, the bolts or other fasteners are typically secured to the pan in a planar base portion of the pan where the pan mates with the support structure. If the pan has a gradual, sloping portion at its lower corners, the available fastening area in a generally planar portion of the pan may be limited It would be advantageous to construct a pan for a wheelbarrow wherein a user is able to scrape contents out of the pan without impacting the head of a bolt that fastens the pan to the support structure or any additional structure that protrudes into the pan carrying space. In addition, it would be advantageous to construct a wheelbarrow pan wherein the fastening bolts or other fasteners are spaced a maximum distance from each other on a generally planar portion of the pan to improve the strength and structural integrity of the mounting of the pan to the support structure.

BRIEF SUMMARY OF THE INVENTION

Briefly stated, the present invention is directed to a wheelbarrow for transporting materials includes an undercarriage, a wheel rotatably mounted to the undercarriage, a pan mounted to and supported by the undercarriage and a fastening mechanism having a head. The pan includes a base wall and an upright wall extending upwardly from the base wall. The base wall and upright wall define a carrying space and a generally smooth, continuous carrying surface facing the carrying space. A depression is formed in the pan defining a depression plane, which is generally continuous with the carrying surface. The fastening mechanism mounting the pan to the undercarriage such that the head is positioned within the depression between the undercarriage and the depression plane.

In another aspect, the present invention is directed to a wheelbarrow for transporting materials including an undercarriage having at least one longitudinal support, a wheel rotatably mounted to the undercarriage, a pan mounted to and supported by the undercarriage and first and second fastening mechanisms having heads. The pan includes a base wall and an upright wall extending upwardly from the base wall. The base wall and the upright wall define a transition portion at their intersection. A first base depression and a second base depression are formed at least partially in the transition portion. A first generally planar engagement surface is defined between the first and second base depressions on the pan. The head of the first fastening mechanism is positioned within the first base depression and the head of the second fastening mechanism is positioned within the second base depression. The first engagement surface is in facing engagement with the at least one longitudinal support in an assembled configuration.

BRIEF DESCRIPTION OF THE SEVERAL VIEWS OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment, which is presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right", "left", "front", "rear", "lower" and "upper" designate directions in the drawings to which reference is made. The words "inwardly" and "outwardly" refer to directions toward and away from, respectively, the geometric center of the wheelbarrow and designated parts thereof. The terminology includes the above-listed words, derivatives thereof and words of similar import.

Referring to the drawings in detail, wherein like numerals indicate like elements throughout, there is shown in FIGS. 1-6, a preferred embodiment of a wheelbarrow, generally designated 10, for transporting materials, in accordance with the present invention.

Figure 1:
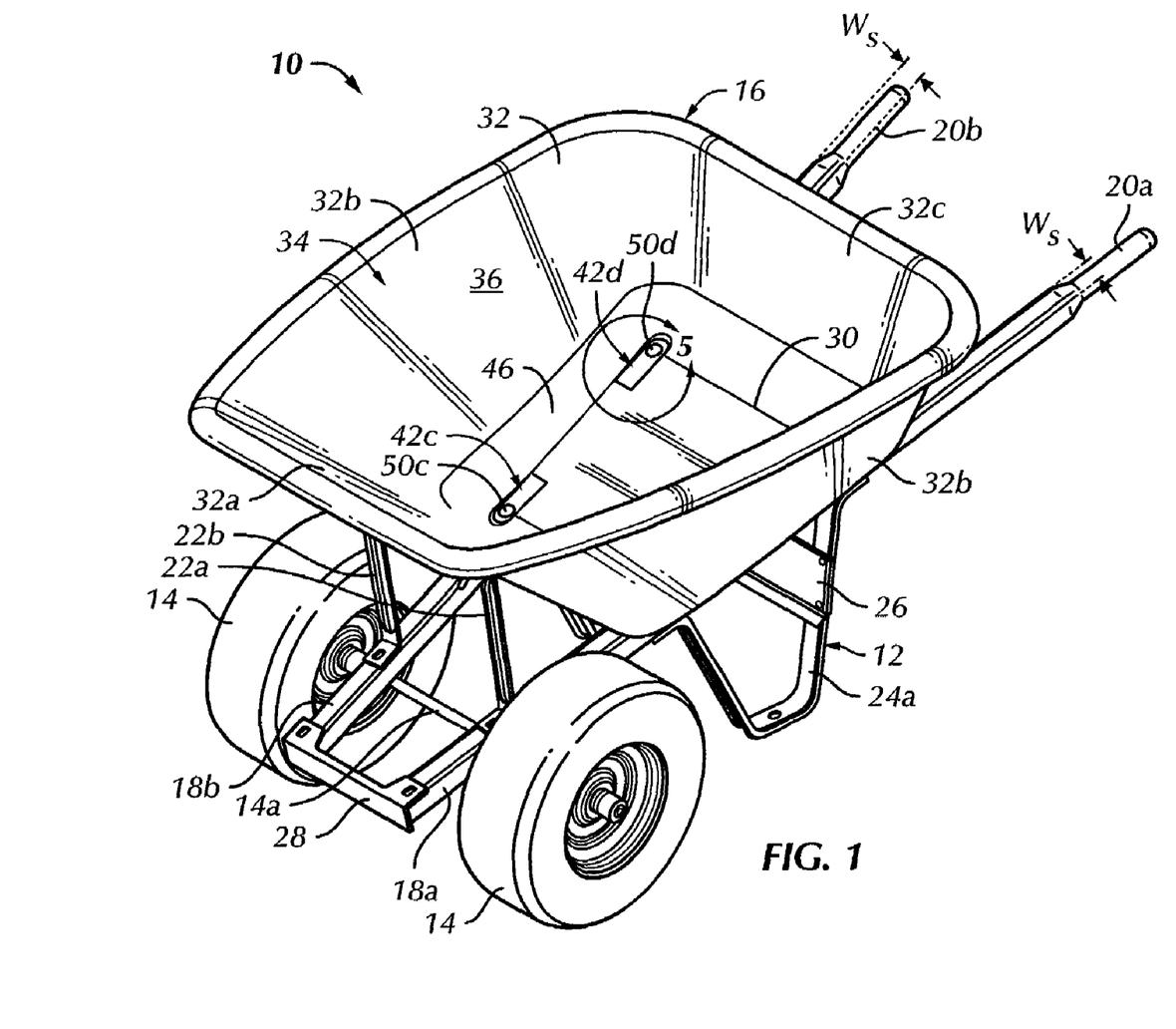
FIG. 1 is a top perspective view of a wheelbarrow in accordance with a preferred embodiment of the present invention.
Figures 3, 4:
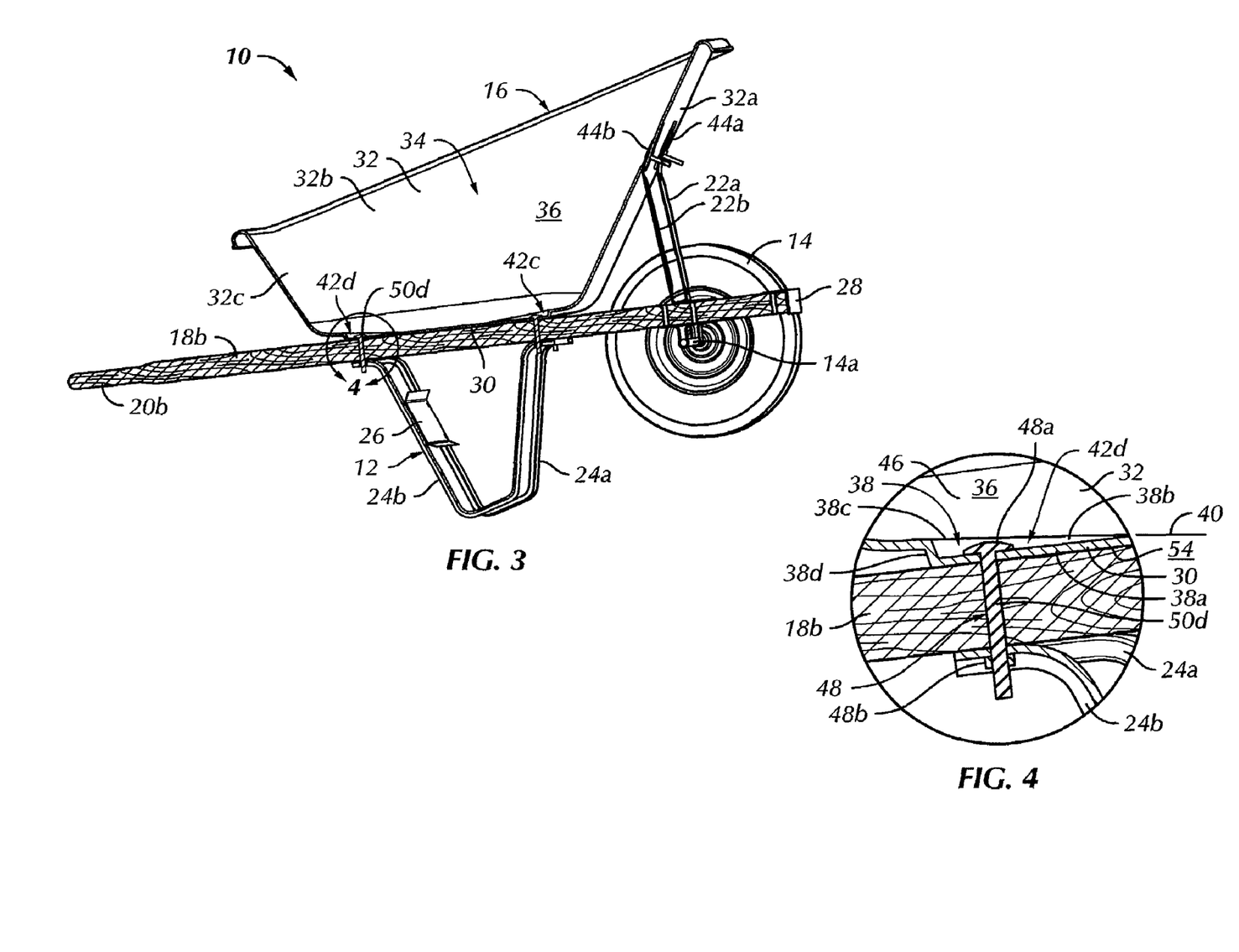
FIG. 3 is a cross-sectional view of the wheelbarrow shown in FIG. 1, taken along line 3-3 of FIG. 2.
FIG. 4 is an enlarged cross-sectional view of a fastening mechanism mounting a pan to a longitudinal support of the wheelbarrow shown in FIG. 1, taken from within circle 4 of FIG. 3.

Referring to FIGS. 1, 3 and 4, the wheelbarrow 10 includes an undercarriage 12 and at least one and preferably two wheels 14 rotatably mounted to the undercarriage 12. The undercarriage 12 is typical for a conventional wheelbarrow and supports a pan 16 that is utilized to support and transport materials.

In the preferred embodiment, the undercarriage 12 includes first and second, generally spaced apart longitudinal supports 18a, 18b, a first handle 20a formed at a proximal end of the first longitudinal support 18a and a second handle 20b formed at a proximal end of the second longitudinal support 18b. The at least one wheel 14 is preferably mounted proximate a distal end of the first and second longitudinal supports 18a, 18b. A pair of wheels 14 is mounted to the first and second longitudinal supports 18a, 18b in the preferred wheelbarrow 10 and provides additional stability to the wheelbarrow 10. The wheelbarrow 10 is not limited to the inclusion of two wheels 14 mounted to the longitudinal supports 18a, 18b to support the pan 16 and may include a single wheel mounted to the undercarriage or nearly any number of wheels that enable the wheelbarrow 10 to perform its preferred functions. The wheels 14 of the preferred embodiment are mounted on opposite ends of an axle 14a that permits rotation of the wheels 14 relative to the undercarriage 12 and provide support to the longitudinal supports 18a, 18b. In operation, a user grasps the handles 20a, 20b, lifts the proximal end and moves the wheelbarrow 10 using the wheels 14, as is generally well known to those having ordinary skill in the art.

In the preferred embodiment, the first and second longitudinal supports 18a, 18b are constructed of a wood material and, more preferably, are constructed of a North American hardwood material. The wooden construction of the first and second longitudinal supports 18a, 18b is preferred for the strength, stiffness, ease of manufacturability, cost effectiveness and relatively light weight of the wood. In addition, the wood construction of the first and second longitudinal supports 18a, 18b is preferred for the ability to integrally form the handles 20a, 20b at the proximal ends. The first and second longitudinal supports 18a, 18b are not limited to being constructed of a wooden material and may be constructed of nearly any generally rigid, structural material that is able to take on the general shape of the first and second longitudinal supports 18a, 18b and perform the typical functions of the first and second longitudinal supports 18a, 18b. For example, the first and second longitudinal support 18a, 18b may be constructed of a metal, polymeric or composite material that is able to take on the general size and shape and perform the typical functions of the first and second longitudinal supports 18a, 18b.

In the preferred embodiment, the handles 20a, 20b are integrally formed at the proximal ends of the first and second longitudinal supports 18a, 18b. However, the first and second handles 20a, 20b are not limited to being integrally formed in the proximal ends of the first and second longitudinal supports 18a, 18b and may be separately mounted to the proximal ends of the first and second longitudinal supports 18a, 18b, formed or mounted in the first and second longitudinal supports 18a, 18b between the proximal ends and the pan 16 or attached to the proximal ends of the first and second longitudinal supports 18a, 18b. For example, the handles 20a, 20b may be comprised of separate metallic and/or polymeric hoop-shaped components that are bolted, adhesively bonded or otherwise fastened to the proximal ends of the first and second longitudinal supports 18a, 18b to provide a grasping surface for a user to hold onto and maneuver the wheelbarrow 10 as would be understood by one having ordinary skill in the art.

In the preferred embodiment, the undercarriage 12 further includes a first front brace 22a, a second front brace 22b, a first leg 24a and a second leg 24b. The first and second front braces 22a, 22b are mounted between the first longitudinal support 18a and the pan 16 and the second longitudinal support 18b and the pan 16, respectively. The first and second front braces 22a, 22b provide support and stiffness for the pan 16 relative to the first and second longitudinal supports 18a, 18b as would be understood by one having ordinary skill in the art. The first and second front braces 22a, 22b are preferably constructed of metallic channels having a generally U-shaped cross-section. The first and second front braces 22a, 22b are not limited to having a metallic construction and a general U-shaped cross-section and may be constructed of nearly any material and have nearly any shape that is able to withstand the normal operating conditions and perform the typical functions of the first and second front braces 22a, 22b. In addition, the first and second legs 24a, 24b are typically mounted to and beneath the first and second longitudinal supports 18a, 18b provide legs that maintain the wheelbarrow 10 in an upright resting position. The legs 24a, 24b are also preferably constructed of a metallic material having a generally U-shaped cross-section and have a generally U-shape for mounting to the underside of the first and second longitudinal supports 18a, 18b. The first and second legs 24a, 24b are not limited to having the general U-shape, constructions of metallic material or U-shaped cross-sections. The legs 24a, 24b may be constructed of nearly any material, have nearly any cross-sectional shape and extend from beneath the first and second longitudinal supports 18a, 18b in nearly any shape as long as they are able to support the pan in a resting position and perform the normal functions and withstand the normal operating conditions of typical legs of the wheelbarrow 10.

The undercarriage 12 also preferably includes a leg brace 26 mounted between the first and second legs 24a, 24b to provide lateral support and additional stiffness for the first and second legs 24a, 24b and a nose piece or nose brace 28 that provides lateral support and stiffness to the first and second longitudinal supports 18a, 18b. The nose brace 28 is preferably mounted to the distal ends of the first and second longitudinal supports 18a, 18b. The leg brace 26 and the nose brace 28 are preferably constructed of a metallic material and have a generally U-shaped cross-section to provide stiffness to the legs 24a, 24b and longitudinal supports 18a, 18b, respectively. The leg brace 26 and the nose brace 28 are not limited to metallic constructions or to having a U-shaped cross-section and may be constructed of nearly any generally stiff, structural material having nearly a shape that is able to support the legs 24a, 24b and longitudinal supports 18a, 18b, respectively.

Figure 2:
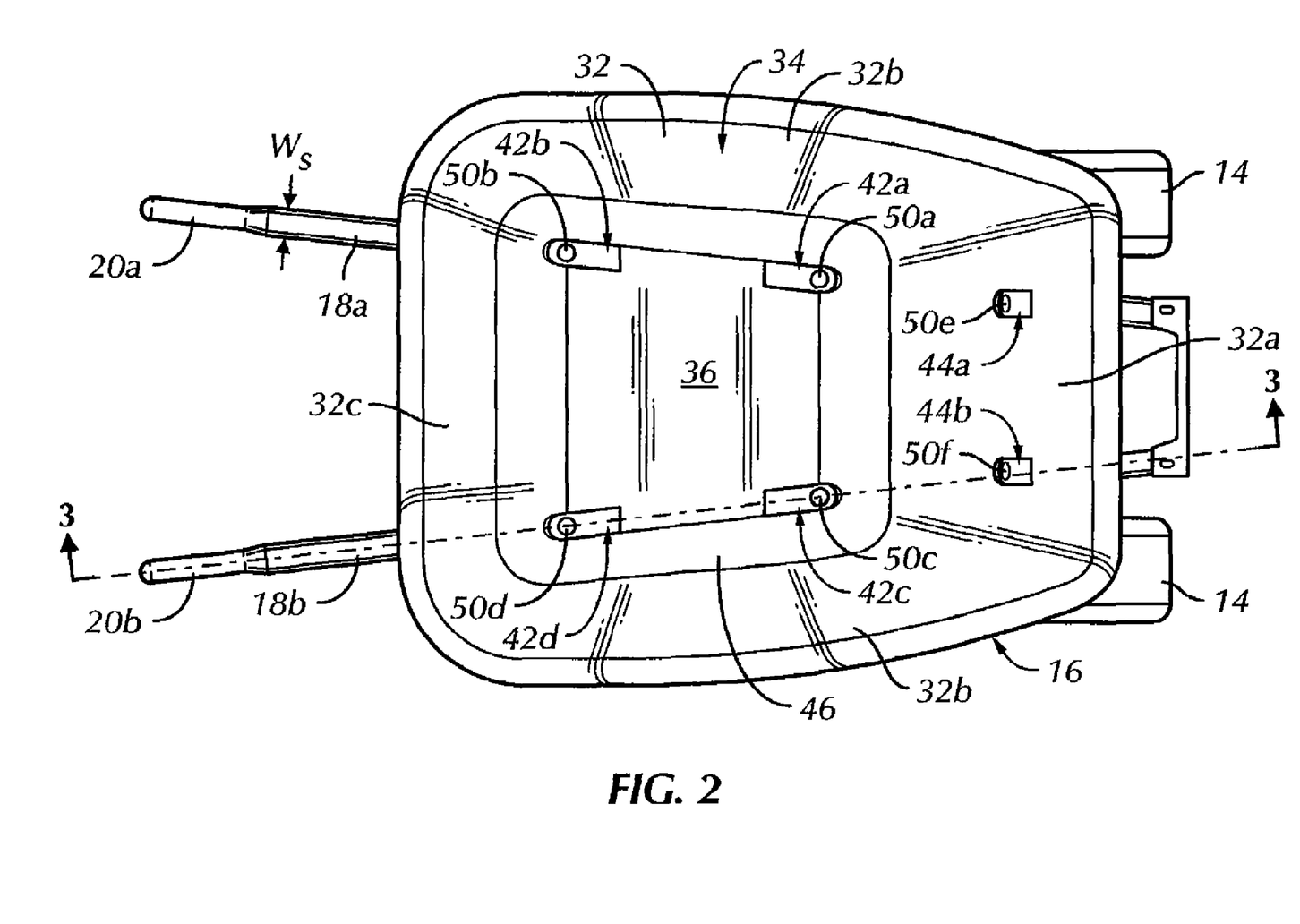
FIG. 2 is a top plan view of the wheelbarrow shown in FIG. 1.

Referring to FIGS. 1-3, the pan 16 includes a base wall 30 and an upright wall 32 extending upwardly from the base wall 30. The base wall 30 and upright wall 32 define a carrying space 34 and a generally smooth, continuous carrying surface 36 that faces the carrying space 34. The carrying space 34 is preferably defined by the base wall 30 and upright wall 32 and is utilized to support and contain the materials being transported by the wheelbarrow 10.

The preferred pan 16 is constructed of an ultraviolet (UV) stabilized, polyethylene material. The pan 16 is not limited to constructions using polyethylene material and the depressions 38 are not limited to being integrally formed in the polyethylene material. The pan 16 may be constructed of nearly any material that is able to take on the general shape of the pan 16 and withstand the normal operating conditions of the pan 16. For example, the pan 16 may be constructed of a formed metallic material or another type of generally structural, rigid polymeric material and the depressions 38 may be constructed of secondary components that are mounted in openings in the metallic pan, as will be understood by one having ordinary skill in the art upon reviewing the below description of the preferred wheelbarrow 10.

Referring to FIGS. 1-5, a depression 38 is formed in the pan 16 and defines a depression plane 40. The depression plane 40 is generally continuous with the smooth, continuous carrying surface 36. In the preferred embodiment, at least a portion of the material that is secured and transported in the pan 16 of the wheelbarrow 10 is in facing engagement with the carrying surface 36 in use.

In the preferred embodiment, the depression 38 is comprised of first, second, third and fourth base depressions 42a, 42b, 42c, 42d formed in the base wall 30 and first and second front depressions 44a, 44b formed in the upright wall 32. The first, second, third and fourth depressions 42a, 42b, 42c, 42d are preferably, integrally formed in the base wall 30 and the first and second front depressions 44a, 42b are preferably, integrally formed in the upright wall 32. The first, second, third and fourth base depressions 42a, 42b, 42c, 42d and the first and second front depressions 44a, 44b have a similar shape and construction and may be generically identified throughout the present application as the depression 38. The wheelbarrow 10 is not limited to the inclusion of the six (6) depressions 42a, 42b, 42c, 42d, 44a, 44b integrally formed in the pan 16 in the locations shown in the attached figures and may include nearly any number of depressions 38 positioned in the pan 16 at nearly any location that is desired by a designer, as will become apparent to one having ordinary skill in the art based upon the below description of the depressions 38.

Figure 5:
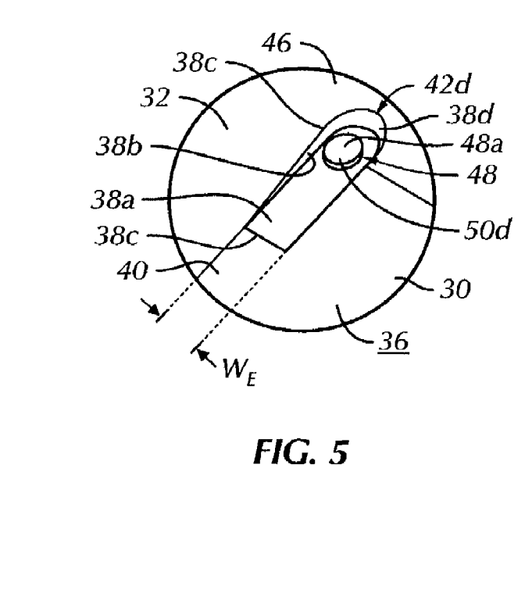
FIG. 5 is a greatly magnified top perspective view of a depression of the pan of the wheelbarrow shown in FIG. 1, taken from within circle 5 of FIG. 1.

Referring to FIGS. 4 and 5, the fourth base depression 42d in the base wall 30 of the pan 16 is shown, however, the general construction, configuration and shape of the fourth base depression 42d is nearly identical to the first, second and third base depressions 42a, 42b, 42c and first and second front depressions 44a, 44b and will be utilized generically to describe the preferred depression 38. Specifically, the preferred depression 38 has a generally wedge-shape with a bottom wall 38a, a pair of side walls 38b, a terminal edge 38c and a spacer wall 38d. In the preferred embodiment, the spacer wall 38d provides height for the wedge-shape of the depression 38, the heights of the side walls 38b taper from the spacer wall 38d to an edge opposite the spacer wall 38d and the terminal edge 38 is defined by an intersection of the depression 38 and the carrying surface 36. Accordingly, the depressions 38 are preferably an integral, sunken portion in the material of the pan 16. The depression plane 40 is defined by the terminal edge 38c or by an intersection of the side walls 38b, the spacer wall 38d and the terminal edge 38c with the carrying surface 36. Generally, the depression plane 40 would be comprised of the shape of the carrying surface 36 of the pan 16 if the depression 38 were not formed in the pan 16.

Referring to FIGS. 1, 2, 5 and 6, in the preferred embodiment, the pan 16 further includes a transition portion 46 located between the base wall 30 and the upright wall 32. The carrying surface 36 of the transition portion 46 has a generally arcuate-shape. The first, second, third and fourth depressions 42a, 42b, 42c, 42d are preferably formed at least partially in the transition portion 46. That is, the depression planes 40 of the first, second, third and fourth base depressions 42a, 42b, 42c, 42d may have a slight curvature, however, the terminal edges 38c of each of the first, second, third and fourth base depressions 42a, 42b, 42c, 42d are able to define a depression plane 40 that would be generally continuous with the carrying surface 36. That is, the depression plane 40 is an imaginary cap, generally a plane on the depression 38 that is defined by the terminal edge 38c and generally separates the carrying space 34 from the depression 38 or delineates the depression 38 from the carrying space 34. In addition, the depression plane 40 is generally smooth and continuous with the carrying surface 36.

A fastening mechanism 48 having a head 48a mounts the pan 16 to the undercarriage 12 such that the head 48a is positioned within the depression 38 between the undercarriage 12 and the depression plane 40. In the preferred embodiment, the fastener 48 is comprised of first, second, third, fourth, fifth and sixth bolts 50a, 50b, 50c, 50d, 50e, 50f that mount the pan 16 to the undercarriage 12. Specifically, the first and second bolts 50a, 50b mount the pan 16 to the first longitudinal support 18a, the third, fourth bolts 50c, 50d mount the pan 16 to the second longitudinal support 18b, and the fifth and sixth bolts 50e, 50f mount the pan 16 to the first and second front braces 22a, 22b. The wheelbarrow 10 is not limited to the inclusion of each of the six bolts 50a, 50b, 50c, 50d, 50e, 50f to mount the pan 16 to the undercarriage 12 and may include nearly any number of bolts or other fasteners that are able to secure the pan 16 to the undercarriage 12 or any type of fastening mechanism 48.

Each of the fastening mechanisms or bolts 48, 50a, 50b, 50c, 50d, 50e, 50f mount the pan 16 to the undercarriage 12 such that their heads 48a are positioned within the depressions 38 between the depression planes 40 and the undercarriage 12. Specifically, the entire head 48 of each of the bolts or fasteners is preferably positioned between the bottom wall 38a of the depression 38 and the depression plane 40. Accordingly, the bolt heads are generally positioned outside of the carrying space 34, which, as was described above, is defined by the carrying surface 36 and the depression plane 40, which is generally smooth and continuous with the carrying surface 36. The depression plane 40 is positioned in the transition portion 46 in the preferred embodiment of the first, second, third and fourth base depressions 42a, 42b, 42c, 42d and may not be comprised as a perfect plane but may have some curvature such that it is defined by the terminal edge 38c of the depression 38.

Figure 6:
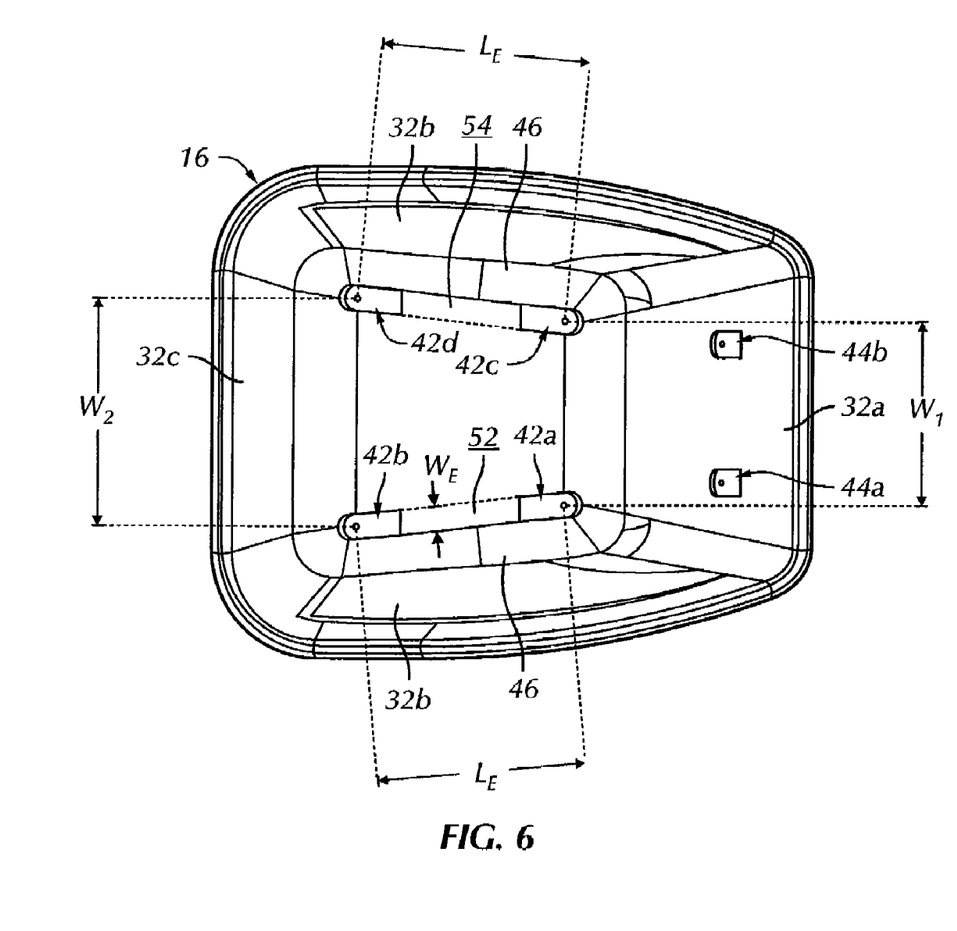
FIG. 6 is a bottom plan view of the pan of the wheelbarrow shown in FIG. 1.

Referring to FIGS. 2, 3 and 6, the pan 16 preferably includes a first, generally planar engagement surface 52 defined between the first and second base depressions 42a, 42b. The first engagement surface 52 preferably extends longitudinally along the bottom surface of the pan 16 and preferably has an engagement width $W_E$ that is generally the same as a support width $W_S$ of the first longitudinal support 18a. In the assembled configuration, the first engagement surface 52 is in facing engagement with the first longitudinal support 18a. Due to the inclusion of the first and second base depressions 42a, 42b, the first engagement surface 52 on the bottom of the pan 16 may be longer or greater in the longitudinal direction than a similar engagement surface of a typical wheelbarrow pan. That is, the formation of the first and second base depressions 42a, 42b in the transition portion 46 of the pan 16 permits the planar first engagement surface 52 to extend into the transition portion 46 and for an engagement length $L_E$ between the first and second bolts 50a, 50b to be spaced a greater distance from each other with the first engagement surface 52 being in facing engagement with the first longitudinal support 18a. In addition, a first spacing width W1 between the first and fourth bolts 50a, 50d and a second spacing width W2 between the second and third bolts 50b, 50c are also greater than in a conventional wheelbarrow because the depressions 38 permit the bolts 50a, 50b, 50c, 50d to be located in the transition portion 46 of the pan 16. Therefore, the overall bolt pattern that mounts the pan 16 to the undercarriage 12 has a relatively larger footprint in the preferred wheelbarrow 10 than in a conventional wheelbarrow.

It is desirable for the fastening mechanisms 48 to be spaced from each other at a maximum distance to support the pan 16 relative to the undercarriage 12 and, specifically, to the first and second longitudinal supports 18a, 18b, because the greater distance between the fastening mechanisms 48 provides greater leverage in reacting forces applied on the fastening mechanisms 48. The formation of the depressions 38 in the transition portion 46 of the pan 16 permits the distances between the fastening mechanisms 48 to be greater than in a conventional wheelbarrow pan as was described above, because the first engagement surface 52 extends into the transition portion 46 and is generally planar into the transition portion 46. In contrast, a fastening mechanism for a typical wheelbarrow is unable to extend into the transition portion 46 of the pan 16 as mounting a fastening mechanism in the transition portion of the conventional pan would be undesirable without the inclusion of the base depressions 42a, 42b, 42c, 42d. Specifically, one having ordinary skill in the art would not typically mount bolts in the transitional portion of the conventional pan because such mounting would result in bending and damage to the pan.

In the preferred embodiment, a second engagement surface 54 is defined between the third and fourth base depressions 42c, 42d and provides the same advantages as the first engagement surface 52 for mounting the pan 16 to the undercarriage 12. Specifically, the second engagement surface 54 is preferably in facing engagement with the second longitudinal support 18b in the assembled configuration.

In the preferred embodiment, the upright wall 32 is comprised of a front wall 32a, a pair of side walls 32d and a rear wall 32c. The front wall 32a is supported relative to the first and second longitudinal supports 18a, 18b by the first and second front braces 22a, 22b. The first and second front braces 22a, 22b are mounted to the front wall 32a by the fifth and sixth bolts 50e, 50f such that the bolt heads 48a are positioned within the first and second front depressions 44a, 44b, respectively.

Referring to FIGS. 1-6, in operation, the pan 16 is mounted to the undercarriage 12 by positioning the first and second engagement surfaces 52, 54 in facing engagement with the first and second longitudinal supports 18a, 18b and the first and second front depressions 44a, 42b in alignment with a top end of the first and second front braces 22a, 22b. The bolts 50a, 50b, 50c, 50d, 50e, 50f are positioned in the first, second, third and fourth base depressions 42a, 42b, 42c, 42d and the first and second front depressions 44a, 44b such that the bolt heads are positioned within the depressions 42a, 42b, 42c, 42d, 44a, 44b, respectively. The fifth and sixth bolts 50e, 50f secure the pan 16 to the first and second front braces 22a, 22b by mounting a nut 48b to the fifth and sixth bolts 50e, 50f. Likewise, the pan 16 is secured to the first and second longitudinal supports 18a, 18b by fastening a nut 48b to the first, second, third and fourth fasteners 42a, 42b, 42c, 42d.

Materials such as concrete, soil, mulch, garbage or nearly any other material is loaded into the pan 16. The material may be transported by grasping the handles 20a, 20b, lifting the wheelbarrow 10 off of the first and second legs 24a, 24b and transporting the wheelbarrow 10 on the wheels 14. To unload the wheelbarrow 10, a user typically shovels or otherwise manually removes the materials from the carrying space 34 in increments or may dump the materials by raising the wheelbarrow 10 using the handles 20a, 20b to pivot about the axle 14a such that the nose brace 28 impacts a support surface and acts as a pivot point. The materials may then be poured out of the pan 16 over a front edge of the front wall 32a.

When a significant portion of the material is unloaded from the pan 16, some materials, such as concrete, soil or otherwise partially sticky or adhesive materials that may adhere to the carrying surface 36 is retained in the pan 16. The operator is able to scrape or otherwise remove this remaining material with a shovel or other tool by scraping or dragging the tool over the carrying surface 36 and urging the material out of the pan 16. The scraping occurs without the tool or shovel impacting the heads 48a of the bolts 48 because the heads 48a are located between the depression plane 40 and the undercarriage 12 and the tool slides over the heads 48a without impacting the heads 48a or a protruding portion of the pan 16. It is desirable that the tool does not impact the heads 48a as impacting heads 48a with the tool may damage the fastening mechanisms 38 or the pan 16. Further, impacting the heads 48a with the tool may potentially damage the tool. Damage to the fastening mechanisms 48, pan 16 and/or tool are all undesirable. After scraping the carrying surface 36 clean using the tool, a relatively small amount of material is retained in the depressions 38. This remaining material may be removed using a broom, manually with the user's fingers or in nearly any additional manner that is able to urge material out of the depressions 38. In addition, the material that is positioned in the depressions 38 after the initial scraping or urging may remain in the depressions 38 without significant adverse impact to the performance of the wheelbarrow 10.

Referring to FIGS. 1-3 and 6, the first and second engagement surfaces 52, 54 provide the relatively large engagement length $L_E$ and first and second spacing widths $W_1$, $W_2$ between the fasteners 48 that mount the base wall 30 to the longitudinal supports 18a, 18b, because the depressions 38 allow the fastening mechanisms 48 to be mounted to the pan 16 in the transition portion 46. The relatively larger distances between the fastening mechanisms 48 and the larger bolt pattern footprint provide additional stiffness and leverage between the pan 16 and undercarriage 12.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A wheelbarrow for transporting materials, the wheelbarrow comprising:
an undercarriage;
a wheel rotatably mounted to the undercarriage;
a pan mounted to and supported by the undercarriage, the pan including a base wall and an upright wall extending upwardly from the base wall, the base wall and upright wall defining a carrying space and a generally smooth, continuous carrying surface facing the carrying space, a depression being formed in the pan, the depression having a bottom wall and defining a depression plane being generally continuous with the carrying surface; and
a fastening mechanism having a head, the fastening mechanism mounting the pan to the undercarriage such that the head is positioned within the depression between the bottom wall of the depression and the depression plane.

2. The wheelbarrow of claim 1 wherein the undercarriage includes first and second longitudinal supports, a first handle formed at a proximal end of the first longitudinal support and a second handle formed at a proximal end of the second longitudinal support, the wheel being mounted proximate a distal end of the first and second longitudinal supports.

3. The wheelbarrow of claim 2 wherein the undercarriage further includes a first front brace, a second front brace, a first leg and a second leg, the first front brace mounted between the first longitudinal support and the upright wall and the second front brace mounted between the second longitudinal support and the upright wall, the first leg mounted to the first longitudinal support and the second leg mounted to the second longitudinal support.

4. The wheelbarrow of claim 3 wherein the upright wall includes a front wall, the depression including a first front depression and a second front depression defining first and second front depression planes, the first and second front depressions having a first bottom wall and a second bottom wall, respectively, the fastening mechanism including first and second front bolts, the first and second front braces mounted to the front wall by the first and second front bolts such that the bolt heads of the first and second front bolts are positioned within the first and second front depressions between the first and second bottom walls and the first and second front depression planes, respectively.

5. The wheelbarrow of claim 1 wherein the depression is comprised of first, second, third and fourth base depressions formed in the base wall and first and second front depressions formed in the upright wall.

6. The wheelbarrow of claim 5 wherein the fastening mechanism is comprised of first, second, third, and fourth base bolts, and first and second front bolts, the pan being mounted to the undercarriage by the first, second, third, and fourth base bolts, and the first and second front bolts.

7. The wheelbarrow of claim 1 wherein the pan further includes a transition portion between the base wall and the upright wall, the carrying surface of the transition portion having a generally arcuate-shape, the depression being formed at least partially in the transition portion.

8. The wheelbarrow of claim 1 wherein the depression includes a pair of side walls, a terminal edge and a spacer wall, the depression plane being bounded by an intersection of the side walls, the spacer wall and the terminal edge with the carrying surface.

9. The wheelbarrow of claim 1 wherein the pan is constructed of a polyethylene material.

10. The wheelbarrow of claim 1 wherein the depression has a generally wedge-shape.

11. The wheelbarrow of claim 1, wherein the depression comprises an elongated shape.

12. The wheelbarrow of claim 1, wherein the depression comprises first and second side walls and a spacer wall, the spacer wall extending from the first side wall to the second side wall.

13. The wheelbarrow of claim 12, wherein a depth of the depression is a distance between the bottom wall and the carrying space and wherein the depth is highest at the spacer wall and decreases in a direction away from the spacer wall.

14. The wheelbarrow of claim 1, wherein a shape of the depression and a portion of the carrying surface adjoining the depression are configured to avoid protruding into the carrying space.

15. The wheelbarrow of claim 1, wherein a shape of a portion of the carrying surface adjoining the depression is planar.

16. The wheelbarrow of claim 1, wherein a portion of the bottom wall of the depression adjacent to and outwardly spaced from the head of the fastening mechanism is planar.

17. A wheelbarrow for transporting materials, the wheelbarrow comprising:

an undercarriage having at least one longitudinal support;
a wheel rotatably mounted to the undercarriage;
a pan mounted to and supported by the undercarriage, the pan including a base wall and an upright wall extending upwardly from the base wall, the base wall and upright wall defining a transition portion at their intersection, a first base depression and a base second depression formed at least partially in the transition portion, a first generally planar engagement surface defined between the first and second base depressions on the pan;
a first fastening mechanism having a head; and
a second fastening mechanism having a head, the head of the first fastening mechanism positioned within the first base depression and the head of the second fastening mechanism positioned within the second base depression, the first engagement surface being in facing engagement with the at least one longitudinal support in an assembled configuration.

18. The wheelbarrow of claim 17 wherein the at least one longitudinal support is comprised of a first longitudinal support and a second longitudinal support, the first longitudinal support having a first handle and the second longitudinal support having a second handle, the first and second longitudinal supports being mounted to the wheel proximate distal ends of the first and second longitudinal supports.

19. The wheelbarrow of claim 18 further comprising:
a third base depression formed in the pan at least partially in the transition portion; and
a fourth base depression formed in the pan at least partially in the transition portion, a second generally planar engagement surface defined between the third and fourth base depressions, the first engagement surface being in facing engagement with the first longitudinal support and the second engagement surface being in facing engagement with the second longitudinal support in the assembled configuration.

20. The wheelbarrow of claim 18 further comprising:
a first front brace mounted between the first longitudinal support and a front wall of the upright wall of the pan;
a first front depression formed in the front wall;
a first front fastening mechanism mounting the first front brace to the pan such that a head of the first front fastening mechanism is positioned within the first front depression;
a second front brace mounted between the second longitudinal support and the front wall;
a second front depression formed in the front wall; and
a second front fastening mechanism mounting the second front brace to the pan such that a head of the second front fastening mechanism is positioned within the second front depression.

21. The wheelbarrow of claim 17 wherein the first and second base depressions have a generally wedge-shape and include respective first and second bottom walls, the first and second base depressions defining first and second depression planes, respectively, and wherein the heads of the first and second fastening mechanisms are positioned within the first and second depressions between the depression planes and the second bottom walls, respectively.

22. The wheelbarrow of claim 17 wherein the pan is constructed of a polymeric material.

23. The wheelbarrow of claim 22 wherein the polymeric material is an ultraviolet (UV) stabilized, polyethylene material.

24. The wheelbarrow of claim 22 wherein the first and second base depressions are integrally formed in the pan.

25. A pan for a wheelbarrow for transporting materials, the pan comprising:

a base wall and an upright wall extending upwardly from the base wall, the base wall and upright wall defining a carrying space and a generally smooth, continuous carrying surface facing the carrying space, a depression being formed in the pan, the depression having a bottom wall and defining a depression plane being generally continuous with the carrying surface, wherein the depression is configured to receive a fastening mechanism for mounting the pan to an undercarriage, wherein the depression is configured such that a head of the fastening mechanism is positioned within the depression between the bottom wall of the depression and the depression plane.

26. The pan of claim 25, wherein the depression comprises first and second side walls and a spacer wall, the spacer wall extending from the first side wall to the second side wall.

27. The pan of claim 26, wherein a depth of the depression is a distance between the bottom wall and the carrying space and wherein the depth is highest at the spacer wall and decreases in a direction away from the spacer wall.

* * * * *

UNITED STATES PATENT AND TRADEMARK OFFICE
CERTIFICATE OF CORRECTION

| | |
|---|---|
| PATENT NO. | : 7,641,204 B2 |
| APPLICATION NO. | : 11/534841 |
| DATED | : January 5, 2010 |
| INVENTOR(S) | : Rye et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 502 days.

Signed and Sealed this

Sixteenth Day of November, 2010

David J. Kappos
*Director of the United States Patent and Trademark Office*